(12) United States Patent
Curtis (10) Patent No.: US 6,601,236 B1
(45) Date of Patent: Jul. 29, 2003

(54) CROSS PLATFORM PROGRAM INSTALLATION ON DRIVES USING DRIVE OBJECT

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,353

(22) Filed: Mar. 29, 1999

(51) Int. Cl.[7] .............................................. G06F 9/445
(52) U.S. Cl. ...................................................... 717/177
(58) Field of Search ............................ 717/11, 174, 177

(56) References Cited

U.S. PATENT DOCUMENTS

| | | | | |
|---|---|---|---|---|
| 5,325,532 A | * | 6/1994 | Crosswy et al. ............... | 713/2 |
| 5,809,251 A | * | 9/1998 | May et al. ................... | 709/223 |
| 5,832,275 A | * | 11/1998 | Olds .......................... | 395/712 |
| 5,999,741 A | * | 12/1999 | May et al. ................... | 395/712 |
| 6,269,480 B1 | * | 7/2001 | Curtis ........................ | 717/106 |
| 6,336,216 B1 | * | 1/2002 | Curtis et al. ................ | 717/174 |
| 6,446,255 B1 | * | 9/2002 | Curtis et al. ................ | 717/121 |
| 6,507,948 B1 | * | 1/2003 | Curtis et al. ................ | 717/174 |

OTHER PUBLICATIONS

"DOS and Windows Present Software Distribution Challenges", James E. Drewes, Network Computing, n 509, P82, published Aug. 1, 1994.*

Buyer's Guide: A server health plan, Edwin Miller, page number 41, Network World, Aug. 5, 1996.*

Using OS/2 2.1 Special Edition, Barry Nance et al., Chapters 6 and 11, published Mar. 25, 1993.*

Indigo Rose Software Design Corp. "Setup Factory 4.0" User's Guide, 1998.

* cited by examiner

Primary Examiner—Todd Ingberg
(74) Attorney, Agent, or Firm—David W. Victor; Konrad, Raynes, Victor & Mann, LLP (57) ABSTRACT

Disclosed is a set of tools or program instructions, an installation program, and a system that operates a drive in a platform independent manner. A drive object represents a single drive mounted by an operating system and contains fields providing information including drive name, block size, free space, type, format long file name support, and space needed by the files to be installed on that drive. During the installation process, each drive is processed to ensure that the drive has sufficient free space for the files to be installed.

30 Claims, 4 Drawing Sheets

| name 402 | freeSpace 404 | blockSize 406 | type 408 | format 410 | usedSpace 412 | longFile Names 414 | info 418 |

CROSS PLATFORM PROGRAM INSTALLATION ON DRIVES USING DRIVE OBJECT

CROSS-REFERENCE TO RELATED APPLICATIONS

This application is related to the following commonly-assigned patent applications, which applications were filed on the same date herewith, and which applications are incorporated herein by reference in their entirety:

"A Cross-Platform Program, System, and Method Having a Global Registry Object for Mapping Registry Equivalent Functions in an AIX Operating System Environment," having Ser. No. 09/280,345;

"A Cross-Platform Program, System, and Method Having a Global Registry Object for Mapping Registry Equivalent Functions in an OS/2 Operating System Environment," having Ser. No. 09/280,350;

"A Cross-Platform Program, System, and Method Having a Global Registry Object for Mapping Registry Functions in a Windows Operating System Environment," having Ser. No. 09/280,349;

"Global Registry Object for Mapping Registry Functions and Registry Equivalent Functions Across Multiple Operating Systems in a Cross-platform Program," having Ser. No. 09/280,371;

"A Cross-platform Program, System, and Method Having a System Independent Registry for Use on Operating Systems Irrespective of a Registry Equivalent," having Ser. No. 09/280,368;

"A System, Method, and Program for Enabling a Use of Property Object Having a Variable for a Property Value in a Cross-Platform Program," having Ser. No. 09/280,344;

"A System, Method, and Program for Overriding Program Properties," having Ser. No. 09/280,346;

"A System, Method and Program for Providing an Object-Oriented Install Architecture," having Ser. No. 09/280,352;

"A System, Method, and Program for Automatic Error Detection While Utilizing a Software State Machine for Carrying out the Process Flow of a Software Program," having Ser. No. 09/280,375;

"A System, Method, and Program for Utilizing a Software State Machine for Carrying Out the Process Flow of a Software Program," Ser. No. 09/280,376;

"A System, Method, and Program for Enabling a Software Program to Automatically Select a System-dependent Function," having Ser. No. 09/280,369;

"A System, Method, and Program for Mapping a Global Object to Desktop Elements of Different Operating Systems," having Ser. No. 09/280,372;

"A System, Method, And Program For Processing Dependencies Using a Dependency Object," having Ser. No. 09/280,370;

"A System, Method, and Program for Modifying a Text File," having Ser. No. 09/280,348;

"A System, Method, and Program for Updating Registry Objects With a Cross-platform Installation Program," having Ser. No. 09/280,351;

"A System, Method, and Program For Preserving Background Settings During Install and Uninstall Operations," having Ser. No. 09/280,374;

"A System, Method, And Program for Modifying a Library Object," having Ser. No. 09/280,347; and "A System, Method, and Program for Performing Program Specific Uninstall Operations," having Ser. No. 09/280,373.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method, system, and program for managing data storage during install operations.

2. Description of the Related Art

An installer program is a software program that enables a programmer to write specific code to install a given application program onto the drives of a computer in a way that enables the given application program to work correctly with the computer's environment, including its operating system. There are several types of installers—Java installers and operating system specific installers, e.g.., Microsoft Windows installers, and International Business Machines ("IBM") OS/2 and AIX operating system installers, etc. Many of the install programs existing today have various limitations in their functionality as discussed below.

One type of Java installer is provided by a software company known as InstallShield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support. A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as the IBM OS/2 and AIX operating systems.

Another Java installer is called "Install Anywhere" from ZeroG. This Java installer program also has a default panel that is not configurable, e.g., the order in which panels appear is not customizable. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Microsoft Windows' 32 installer, e.g., Microsoft Windows 95/98 and NT. Although this installer program is widely used throughout the industry, it is based upon a proprietary scripting language developed by InstallShield. The scripting language is similar to Basic programming language. Programmers, who generally have experience and knowledge of object oriented programs such as C++ and Java, must learn this proprietary InstallShield script, which is not related to the popular computer languages, in order to program an Install program. This unfamiliarity with the proprietary InstallShield scripting language complicates the installer programming process.

Furthermore, programs are frequently installed onto more than one disk drive or other data storage drive. Many installation programs do not adequately check to ensure that each destination drive has sufficient available storage space before initiating the installation onto those drives. For example, it is believed that many Java installers do not check drive space at all. This is particularly troublesome if as is often the case, the user is not given a choice as to which drives the various parts of the program are installed. Other installation programs such as Installshields for Windows do give the user a choice as to one or more of the destination drives but typically require the user to keep track of the space available on each drive and the amount of space required.

Also, many disk drives have a predetermined minimum disk space, often referred to as a "block size," for storing a file on the drive. Thus, if a file is substantially smaller than the block size, the disk drive will still require a full block to be available to store that file. Hence, the indicated total size of the files to be stored on a drive often does not provide a true indication of the total storage space needed to store those files on a particular drive. As a result, time can be wasted in a futile attempt to store a set of files on a drive despite the fact that the drive has free space available which exceeds the actual size of the files but is less than the total number of blocks required.

Thus, there is a need in the art for a cross-platform installation program that is capable of installing and uninstalling a product on different operating systems and, at the same time, is capable of checking the storage space of the intended destination data storage drives of the operating system.

SUMMARY OF THE PREFERRED EMBODIMENTS

To overcome the limitations in the prior art described above, preferred embodiments disclose a system, method, program, and data structure for installing a program onto a computer including an operating system. In accordance with one aspect of the present invention, a drive object is created to represent a data storage drive such as a disk drive, preferably, in a platform independent manner. In the illustrated embodiment, a unique drive object is created for each data storage drive in the operating system. Each drive object maintains information about the associated drive. For example, in the illustrated embodiment, fields or instance variables represent the drive's name, the amount of free space available on that drive, the block size of the drive, the drive type, the data storage format, and whether the drive supports long file names. In addition, each drive object can store for each set of files intended to be stored on the associated drive, the amount of disk storage space to store those files. Prior to installation of the files, the amount of space needed to install all of the files intended to be installed on a particular drive can be compared to the free space available on the drive to ensure there is adequate space available. As explained in greater detail below, such an arrangement facilitates successful installation of files on a plurality of drives without requiring the user to manually check all the destination disk drives prior to installation.

In accordance with another aspect of the present invention, by storing the block size, that is, the minimum space required by the drive to store a file, the actual drive space required to store a set of files may be accurately calculated and compared to the free space available. As consequence, it may be accurate determined prior to installation whether or not the intended destination drive has sufficient storage space available to store a particular set of files.

With preferred embodiments the install program can function as a cross-platform installer that can be used to install products across multiple operating systems including those having a plurality of data storage drives on which files are installed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
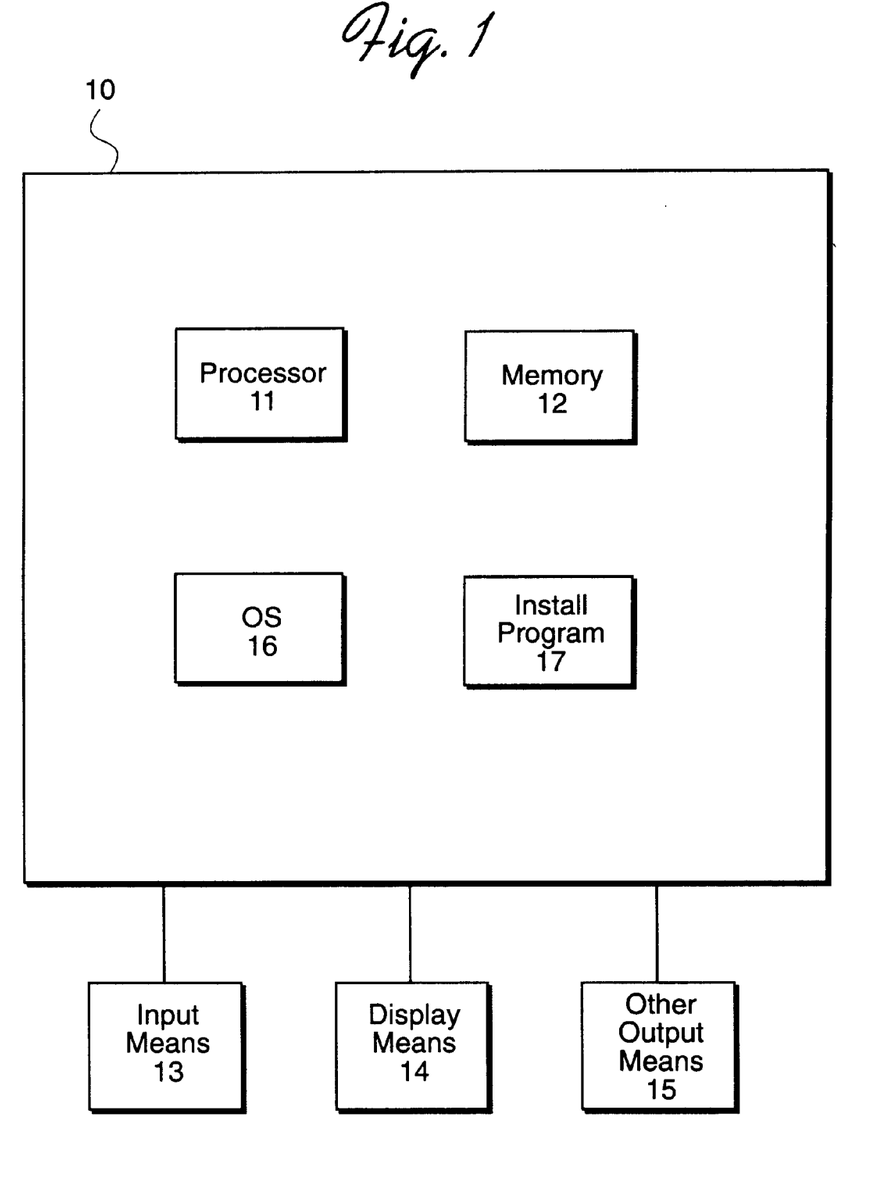
FIG. 1 is a block diagram illustrating a software and hardware environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed.

The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
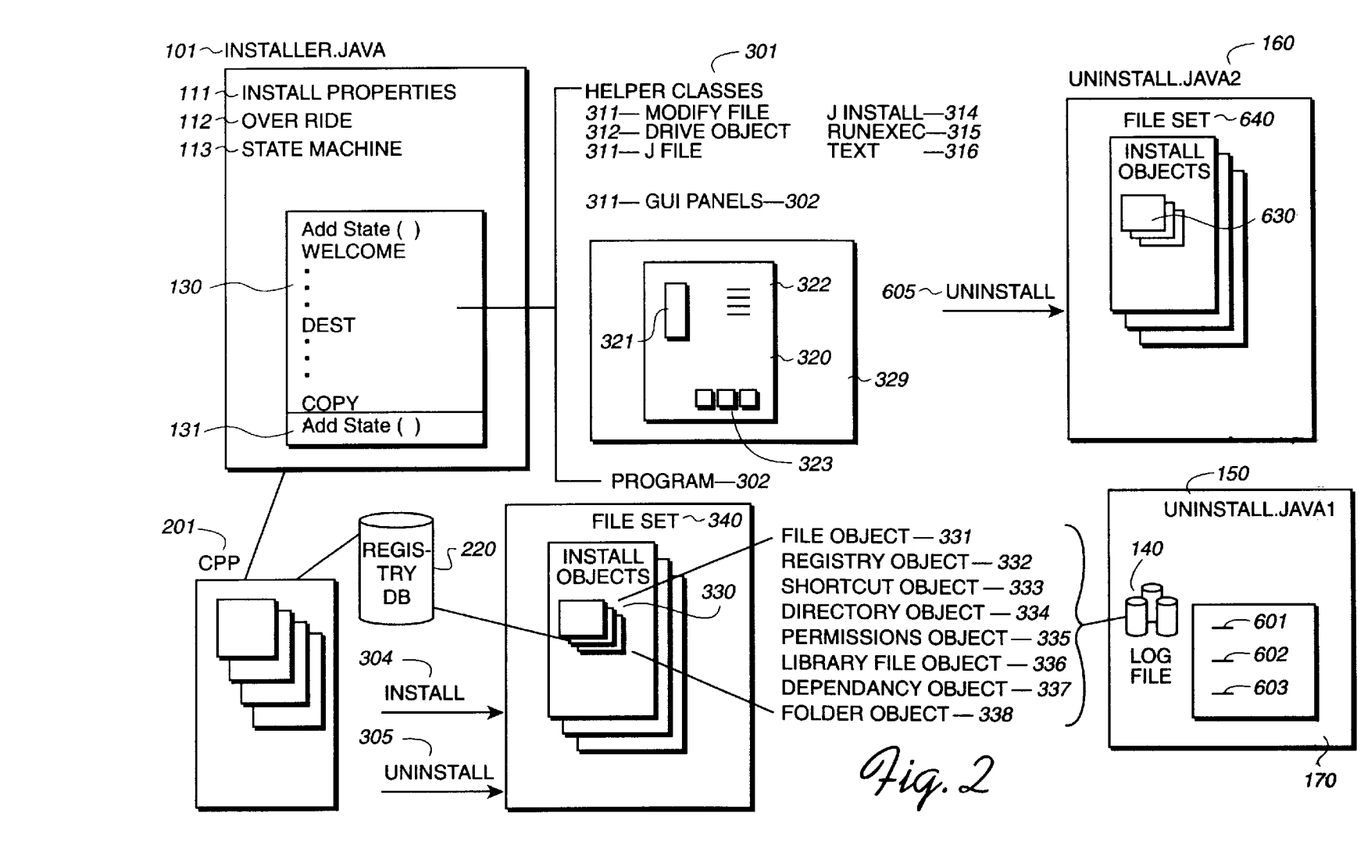
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Javal" 150 which implements a "base uninstall" class, which includes several methods that get called at different points during uninstall. During install, the log 140 and "uninstall.Javal" 150 information are built. The log file 140 and "uninstall.Javal" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the fuinctions and flow of control of the program; iv) automatically detecting a programming error if a programmer incorrectly specifies a non-existent state within the state machine; v) automatically selecting a system-dependent function; vi) a containment structure consisting of program object, fileset objects, install objects, where each fileset object and install object contains means to install and uninstall itself and to log itself; vii) enabling the management of folders, shortcuts and icons; viii) enabling environment variables to be read, created, modified and deleted; ix) providing dependency checking of prerequisite programs during both install and uninstall; and x) providing various logs, e.g. a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source adirectories. For example, there can be multiple components of file sets included in an install where a file set is a separately installable/uninstallable piece of code or set of files.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

Drive Object

Figure 3:
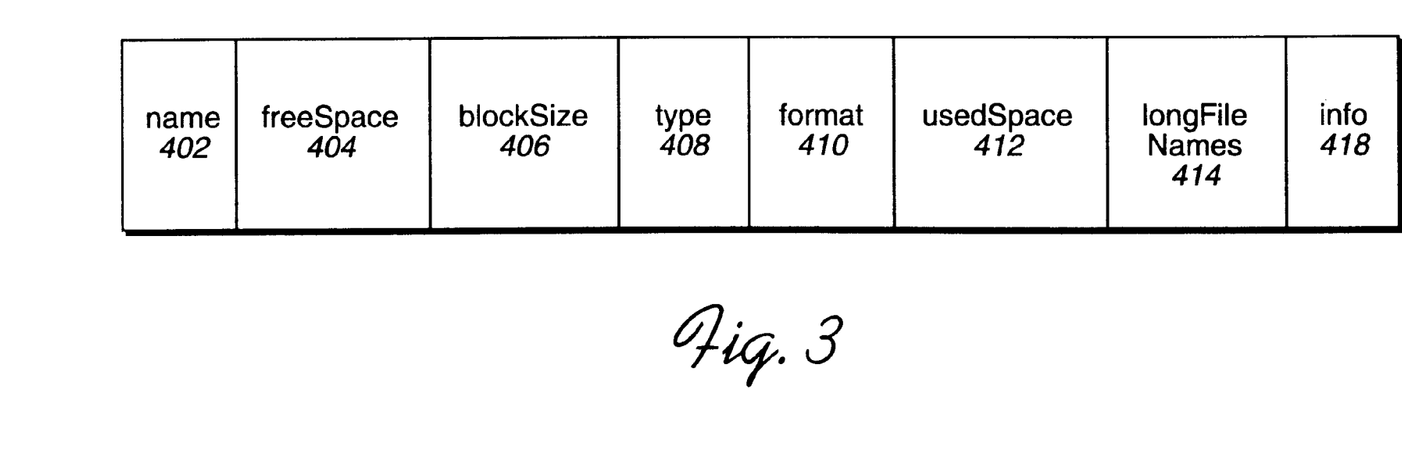
FIG. 3 illustrates the fields in a drive object in accordance with preferred embodiments of the present invention.

Preferred embodiments provide a drive object 400, illustrated in FIG. 3, that represents a drive in a platform independent manner. Each drive object is used to keep track of the amount of storage space available on a particular drive and the amount of space needed to install one or more portions of the program onto that drive. In preferred embodiments, the drive object 400 includes a constructor to create a drive object 400 for each data storage drive available to the operating system and facilitates methods which allow the user to ensure that each of the intended destination storage drives has sufficient storage space to install those files which are selected for storage on that drive. The methods may utilize fields in the drive object 400 during execution of the installation program, e.g., installerjava 101. The user may add the drive object 400 and other commnands, discussed below, to ensure sufficient storage space during installation. The drive object 400 and commands may be added in the state section 130 of the installation program 101.

FIG. 3 illustrates fields included in the drive object 400. The name 402 field indicates the name of the data storage drive. In the illustrated embodiment, the name field is stored as a string of characters such as "C:", "D:" etc. The freeSpace field 404 indicates the amount of space available on the storage drive to store additional files. The blockSize 406 field represents the size of a block on the drive, which is the minimum space required to store a single file. For example, if the drive's block size is 32K, the disk drive will require storage space in increments of 32K to store a file. Thus, even if a file is only one byte in length, the disk drive will require one block, that is, 32K of storage to store that file. A file having a length of 33K bytes will require two blocks, that is, 64K bytes of storage. The type 408 field indicates the type of that data storage drive associated with the particular drive object. Examples of drive types include removable disk drives, fixed disk drives, CD-ROM drives, RAM disks, network drives or any device capable of storing information, preferably in large quantities. In the illustrated embodiment, the drive type may be stored as an integer representing the particular type.

The format field 410 is, in the illustrated embodiment, a string representing the format in which data is stored on the particular drive. Examples of data formats found on drives include FAT, NTFS, HPFS, and CDFS. The usedSpace 412 field is a hash table having an entry which identifies each set of files which are intended to be installed on the drive of the drive object. For each such file set entry, a corresponding value is set which indicates the amount of storage space required to store that file set onto the drive. As explained below, these entries are preferably set in each drive object as the each of the file sets of install objects are built up in the initial part of the installation program. The longFileNames 414 field indicates whether the drive of the drive object supports long file names, that is, names longer than the eight character dot three character names of the early operating systems. The info 418 field indicates whether all of the information has been retrieved or only a part.

After using a constructor command to create the drive object 400, certain methods may be called to set the values in the fields of the object 400. For instance after constructing the drive object 400, a command may be used to set the drive name to indicate the name of the drive represented by the drive object.

Methods for Ensuring Adequate File Installation Space

Preferred embodiments concern methods to ensure adequate file installation space in each destination drive which is to receive one or more of the files to be installed. Within the state machine 130 portion of the installerjava program 101, the installation developer may add methods to perform specific tests to ensure that each destination drive has sufficient free space. As discussed, the installation developer initially adds a command or constructor to generate a drive object 400 for each data storage drive to represent that storage drive and maintain information concerning that drive in the fields discussed with respect to FIG. 3. After constructing the drive object, the installation developer may insert any of the following methods and constructors to perform specific operations:

DriveObiect( ): Creates a drive object 400 with default values to be defined using the methods below.

DriveObiect(string dName): This is a constructor that creates the drive object 400 and performs the operations of setting the drive name 402 field to dName, i.e., the drive represented by the drive Object. Thus, the DriveObject(string) constructor may be used in lieu of the setName( ) method below.

getName( ): This method returns the drive name.

setName(string): Sets the drive name field 402 as indicated by the string parameter.

getBlockSize( ): This method returns the size of a block (the minimum storage unit for a file) on the named drive as measured in bytes.

getFreeSpace( ): This method returns the amount of free storage space on the named drive as measured in bytes.

getFreeSpaceAsString( ): This method returns the amount of free disk space formatted into a string such as "1.3 MB" or "2.1 GB".

getDriveFormat( ): This method obtains the format for the named drive. These formats may include NTFS, FAT, HPFS, etc.

getLongFileNameSupportf( ): This method returns an indication as to whether the named drive supports long file names.

getTvpe( ): This method returns the drive type.

getTyleAsString( ): This method returns the drive type as a string such as "unknown", "no root directory", "removable", "fixed", network", "cdrom", or "ram".

getUsedSpace( ): This method returns the amount of space needed by all filesets for this drive.

getUsedSpace(FileSet): This method returns the amount of space needed by the named fileset.

setUsedSpace(FileSet, long): This method sets the amount of space needed by the named file set in the hash table field usedSpace 412.

checkDiskSpace( ): This method checks to see if there is enough free disk space on the named drive to install the file sets that are marked to be installed on that drive.

toString( ): This method overrides tostring in class Object.

As discussed, in preferred embodiments, the installation program would create a drive object for each potential destination drive in the computer system on which the program is being installed. The installation developer may insert methods in the installer program, e.g., installer.java, to register each file set to be installed with the drive objects of the selected destination drives so that each drive object may be examined to determine whether the amount of storage needed to install the files intended to be installed on that drive is less than or equal to the amount of space available on that drive.

Figure 4:
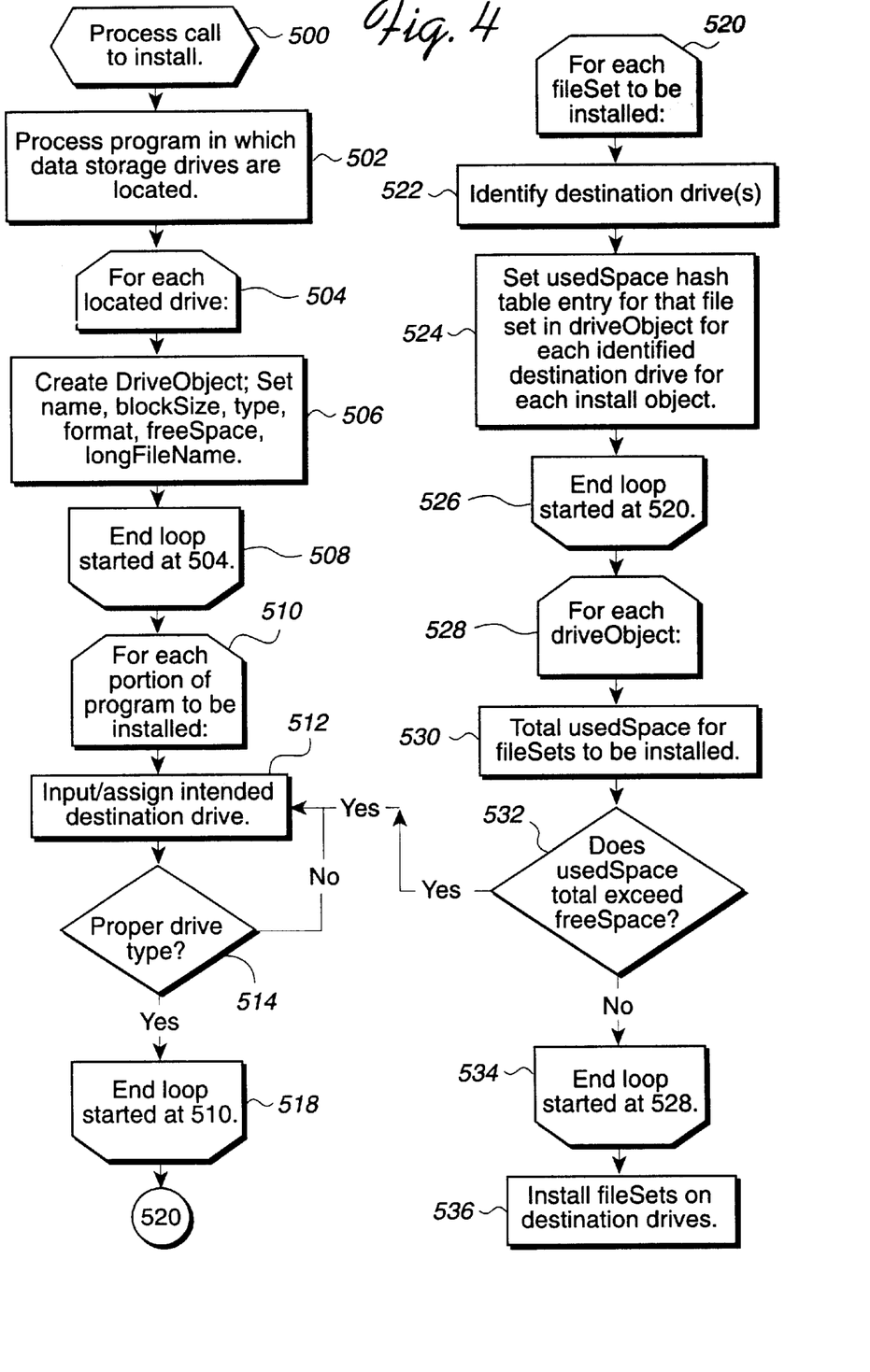
FIG. 4 illustrates logic implemented in the install program to check drive objects to ensure adequate available storage space prior to installing file sets in accordance with preferred embodiments of the present invention.

FIG. 4 illustrates logic implemented in the install program to execute certain of the methods discussed above when called to determine if each of the file destination drives has sufficient free space. As previously mentioned, the install program includes a program object 303 comprised of file set objects 340. Within each file set object 340 there are multiple install objects 330. There are several types of install objects including file object 331, registry object 332, shortcut object 333, directory object 334, permissions object 335, a library file object 336, a dependency object 337, and folder object 338. In addition, all of the install objects have certain methods on each of them. In particular, each install object knows how to install or uninstall itself, how much disk space it needs, how to log itself, and how to internalize from a log, i.e., how to build itself back up again from reading from a log.

The install process that the script 101 enables includes running the state machine 113 through various states 130 which cause different events to take place. The install properties 111 may be used in the destination state by having a destination panel set a particular destination directory name of an install property to a particular directory. During the copy state, the program object 303 is built-up including all of the install objects 330.

Following a call to install (block 500) the program, the installation program searches (block 502) the computer system and locates the data storage drives on which the program files could potentially be installed upon. For each such located drive (block 504), the installation program creates a drive object. Each created drive object in turn initializes itself setting fields of the drive object using the get and set methods discussed above. In the illustrated embodiment, the name field 402, block size field (406), the drive type field 408, the data storage format field 410, the free space field 404, and the long file names field 414 are set in this initial portion of the installation program.

As discussed, the CPP modules 201 contain operating system specific code, called by the various objects, to perform specific processing at different points of the installation process. The CPPs 201 are thus an interface program between the installation and the operating system. As discussed, there is a separate CPP file for each operating system on which the install program 17 is capable of installing the program object 303. The operating system usually includes native commands for examining the data storage drives available to the operating system and reporting the results of the examination. For this reason, in preferred embodiments, the steps of setting the fields of the drive object during installation are performed by the drive objects using the CPP 201 modules which provide access to the native operating system commands. Thus, the processes of obtaining from each drive the necessary information needed to set the fields or instance variables of the drive objects, representing, for example, the drive's name, the amount of free space available on that drive, the block size of the drive, the drive type, the data storage format, and whether the drive supports long file names may be handled by native operating system commands called from within the CPP 201 modules, which are called by the drive objects during installation.

Use of the CPPs 201 implements the installer across operating system platforms by allowing the installation program developer to utilize native operating system commands when needed to complete operations with respect to obtaining the information needed to initialize the drive objects. The installation program creates the drive objects which then call the appropriate CPP for that operating system to obtain the needed drive information to initialize the drive objects.

For example, the free space field 404 is set by the drive object which calls the CPP which issues the proper system operations to determine the amount of free storage space which remains in the selected destination drive. The drive object then sets the free space field 404 in the drive object of the selected destination drive. This loop is continued until (block 508) a drive object has been created for each potential destination data storage drive for the files to be installed.

Because of the flexibility afforded by an installation program in accordance with the present invention, the installation programmer can readily provide the user the opportunity to select the destination drives for one or more portions of the program to be installed. Hence, for each portion of the program to be installed (block 510), the installation program can input (block 512) the desired destination drive for that program portion. For example, a GUI panel may pop up on the screen during a destination state of the state machine 113 of the script 101, to request the user to select the desired destination drive for that portion of the program to be installed. The type field 408 of drive object for the selected drive may then be tested (block 514) to ensure that it is a proper drive. For example, if the user inadvertently selects a CD-ROM drive which is nonwritable, control returns to block 512 to input another destination drive. This process continues until a proper destination drive has been input (block 512) for each program portion having a user selectable destination drive.

In some programs to be installed, the installation programmer may desire to not provide the user the option of selecting the destination drive for one or more portions of the program to be installed. In those instances, the program can assign (block 512) the desired destination drive or a default drive for a each such program portion.

As each file set is being built up (block 520), the install objects of the file set dentify (block 522) the destination drive or drives on which the files of the install objects are to be installed. As previously mentioned, the destination drives may be assigned by the user, by the programmer or by default. Each install object has a method (getsize) which determines the number of bytes of the destination drive's memory needed by the files of the install object for installation on the destination drive in the manner discussed above. Once all of the install objects of the file set determine the number of bytes needed to install the components on the destination drives, the program registers with each drive object associated with a destination drive for that file set. The program sets (block 524) an entry in the hash field of the usedSpace field 412 of each destination drive object with the name of the file set and the number of bytes needed to install the files of that file set on the drive. This is done for each install object in case an install object uses space on a different drive than the one selected in block 512. An example is a desktop icon that always uses space on drive C. This process continues until each of the file sets of the program object have registered in the destination drive objects the name of the file set and the amount of storage space needed to install the files of the file set in that particular drive for each install object.

Once all the file sets have registered the space needed in each of the affected destination drive objects, the program examines each drive object in turn, totaling (block 530) the usedSpace values in the hash table of that drive object to determine the total amount of storage space needed to store the file sets or portions of file sets intended to be installed on the drive of that drive object. The install program then compares (block 532) the calculated total space needed in that drive to the amount of storage space available in that drive as indicated by the freeSpace field (404) of the drive object. If there is sufficient space available in that drive, the install program returns to block 530 to check the next destination drive object. On the other hand, if the available free storage space is insufficient, control returns to block 512 for the user to input an alternate drive. This process continues until all of the destination drive objects have been checked to ensure the availability of sufficient additional storage space.

Once it has been established that all of the destination drives have sufficient free space to accommodate the file sets of the program object, the file sets are installed (block 536) on the assigned destination drives. In the illustrated embodiment, the file sets are not installed on the destination drives until it has been verified that each of the destination drives has sufficient additional space available. Alternatively, an installation of one or more files may proceed immediately following verification that the intended destination drive or drives for those files has adequate free space to accommodate the files.

Preferred embodiments thus provide instructions, functions or methods that may be called during installation of a program on the computer to ensure adequate free space for files on destination drives. Such an arrangement facilitates successful installation of files on a plurality of drives without requiring the user to manually check all the destination disk drives prior to installation. Furthermore, by storing in the drive object the block size, that is, the minimum space required by the drive to store a file, the actual drive space required to store a set of files may be accurately calculated and compared to the free space available. As consequence, it may be accurately determined prior to installation whether or not the intended destination drive has sufficient storage space available to store a particular set of files.

With preferred embodiments the install program can function as a cross-platform installer that can be used to install products across multiple operating systems.

The preferred installation program installs files using the cross-platform code, preferably written in a cross-platform language such as Java, and bypasses the need to use the native installation routines, which requires the development of specific installation packages for each operating system on which product will be installed. Thus, with preferred embodiments, an installation developer need only develop a single installation package, i.e., the install program 303, including FileSets 340, install objects 330 and drive objects 400, that may then be applied to different operating system platforms. Further, the preferred embodiment install program 17, which operates in the same manner across different operating system platforms, has the same affect on the operating system as the native installation program. This is accomplished with the logic of FIG. 4 that determines whether the intended destination drives have sufficient space prior to installing the program files on those drives. The CPP 201 could contain a separate file for each operating systems on which the install program 17 operates.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

Furthermore, one or more of the drive object fields may be set at a later time than when the drive object is created, depending upon the application. For example, the free space field 404 of a particular drive object may be set after the drive of that drive object has been identified as a destination drive. Determining fields such as the free space available may be time consuming for some data storage drives, such as network drives, for example. Accordingly, the installation program may be designed to defer setting the free space field until such time as it has been determined that the drive will actually be used to install program files. Similarly, any other drive object fields which require substantial time to be determined and set may also be deferred until the drive has been determined to be a program installation destination drive.

Preferred embodiments described the use of the above methods to check data storage capacity prior to installing files of a program being installed. However, the above described methods may be used in other contexts whenever a file needs to be stored, modified or updated. In addition, the number and nature of the fields of the drive object may be varied, depending upon the application.

In summary, preferred embodiments disclose a set of programming tools or program instructions, an installation program, and a system for monitoring data storage capacity. A drive object is created to represent a data storage drive such as a disk drive. Each drive object maintains information about the associated drive. For example, in the illustrated embodiment, fields or instance variables represent the drive's name, the amount of free space available on that drive, the block size of the drive, the drive type, the data storage format, and whether the drive supports long file names. In addition, each drive object can store for each set of files intended to be stored on the associated drive, the amount of disk storage space to store those files. Prior to installation of the files, the amount of space needed to install all of the files intended to be installed on a particular drive can be compared to the free space available on the drive to ensure there is adequate space available.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for installing a program onto a computer including an operating system, comprising:

executing an installation program which generates a separate drive object for each storage device having a capability to be a destination drive in the computer on which at least a portion of the program is being installed;

storing drive information of each storage device in each separate drive object;

receiving an indication indicating at least one intended destination drive for each portion of the program;

storing, in each drive object corresponding to one intended destination drive an amount of data storage space needed to store a portion of the program intended to be stored onto the destination drive;

determining, from the drive information stored in the drive object for one intended destination drive, whether the intended destination drive has sufficient storage space to install the portion of the program; and storing onto the intended destination drive the portion of the program intended to be stored if it is determined that the intended destination drive has sufficient data storage space available.

2. The method of claim 1, wherein said drive information stored with each drive object comprises at least one of the amount of free space available on the data storage drive, drive name, block size, drive type, and data storage format.

3. The method of claim 1, wherein the indication is received from user input selecting an intended destination drive.

4. The method of claim 3, further comprising:

getting, by the installation program, from the drive object the type of the destination drive selected by the user and rejecting the selection if the selected data storage drive is an improper type.

5. The method of claim 1, wherein said drive information further includes the block size of the data storage drive representing a minimum amount of space required to store a file on the data storage drive and wherein said amount of data storage space needed to store a portion of the program intended to be stored onto the data storage drive is a function of said data storage drive block size.

6. The method of claim 1, wherein receiving the indication indicating an intended destination drive for each portion of the program is performed by the installation program that assigns the intended destination drive for each portion of the program.

7. The method of claim 1, wherein the installation program is a cross platform installation program which generates the drive objects independently of the operating system running on the computer, and wherein the cross platform installation program accesses operating specific commands for a given operating system on the computer to perform installation program operations.

8. The method of claim 1, further comprising:

registering, for each destination drive, file sets including the portion of the program intended to be stored onto the destination drive with the drive object for the destination drive, wherein the data storage space needed to store the portion of program intended to be stored on the destination drive stored in the drive object comprises a number of bytes needed to install the file sets registered with the drive object, and wherein storing onto the intended destination drive the portion of the program comprises storing the file sets registered with the drive object for the intended destination drive.

9. A system for installing a program, comprising:

a computer including an operating system, a computer monitor;

a memory device;

program logic executed by the computer in communication with the computer monitor and the memory device, wherein the program logic performs:

(i) executing an installation program which generates a separate drive object for each storage device having a capability to be a destination drive in the computer on which at least a portion of the program is being installed;

(ii) storing drive information of each storage device in each separate drive object;

(iii) receiving an indication indicating at least one intended destination drive for each portion of the program;

(iv) storing, in each drive object corresponding to one intended destination drive, an amount of data storage space needed to store a portion of the program intended to be stored onto the destination drive;

(v) determining, from the drive information stored in the drive object for one intended destination drive, whether the intended destination drive has sufficient storage space to install the portion of the program; and (vi) storing onto the intended destination drive the portion of the program intended to be stored if it is determined that the intended destination drive has sufficient data storage space available.

10. The system of claim 9, wherein the drive information stored with each drive object comprises at least one of the amount of free space available on the data storage drive, drive name, block size, drive type, and data storage format.

11. The system of claim 9, wherein the indication is received from user input selecting an intended destination drive.

12. The system of claim 11, wherein the program logic further performs for getting from the drive object the type of the destination drive selected by the user and rejecting the selection if the selected data storage drive is an improper type.

13. The system of claim 9, wherein said drive information further includes a block size of the data storage drive representing the a minimum amount of space required to store a file on the data storage drive and wherein said amount of data storage space needed to store a portion of the program intended to be stored onto the data storage drive is a function of said data storage drive block size.

14. The system of claim 9, wherein the step of receiving the indication indicating an intended destination drive for each portion of the program is performed by the installation program that assigns the intended destination drive for each portion of the program.

15. The system of claim 9, wherein the installation program is a cross platform installation program which generates the drive objects independently of the operating system running on the computer, and wherein the cross platform installation program accesses operating specific commands for a given operating system on the computer to perform installation program operations.

16. The system of claim 9, wherein the program logic further performs:

registering, for each destination drive, file sets including the portion of the program intended to be stored onto the destination drive with the drive object for the destination drive, wherein the data storage space needed to store the portion of program intended to be stored on the destination drive stored in the drive object comprises a number of bytes needed to install the file sets registered with the drive object, and wherein storing onto the intended destination drive the portion of the program comprises storing the file sets registered with the drive object for the intended destination drive.

17. An article of manufacture for use in programming a computer system to install a program, the article of manufacture comprising computer useable media accessible to the computer system, wherein the computer usable media includes at least one computer program that is capable of causing the computer system to perform:

executing an installation program which generates a separate drive object for each storage device having a capability to be a destination drive in the computer on which at least a portion of the program is being installed;

storing drive information of each storage device in each separate drive object;

receiving an indication indicating at least one intended destination drive for each portion of the program;

storing, in each drive object corresponding to one intended destination drive an amount of data storage space needed to store a portion of the program intended to be stored onto the destination drive;

determining, from the drive information stored in the drive object for one intended destination drive, whether the intended destination drive has sufficient storage space to install the portion of the program; and storing onto the intended destination drive the portion of the program intended to be stored if it is determined that the intended destination drive has sufficient data storage space available.

18. The article of manufacture of claim 17, wherein said drive information stored with each drive object comprises at least one of the amount of free space available on the data storage drive, drive name, block size, drive type, and data storage format.

19. The article of manufacture of claim 17, wherein the indication is received from user input selecting an intended destination drive.

20. The article of manufacture of claim 19, wherein said drive object variables further include a type of the data storage store drive, further comprising getting from the drive object the type of the data storage drive selected by the user and rejecting the selection if the selected data storage drive is an improper type.

21. The article of manufacture of claim 17, further comprising:

getting, by the installation program, from the drive object a type of the destination drive selected by the user and rejecting the selection if the selected data storage drive is an improper type.

22. The article of manufacture of claim 17, wherein receiving the indication indicating an intended destination drive for each portion of the program is performed by the installation program that assigns the intended destination drive for each portion of the program.

23. The article of manufacture of claim 17, wherein the installation program is a cross platform installation program which generates the drive objects independently of the operating system running on the computer, and wherein the cross platform installation program accesses operating specific commands for a given operating system on the computer to perform installation program operations.

24. The article of manufacture of claim 17, further comprising:

registering, for each destination drive, file sets including the portion of the program intended to be stored onto the destination drive with the drive object for the destination drive, wherein the data storage space needed to store the portion of program intended to be stored on the destination drive stored in the drive object comprises a number of bytes needed to install the file sets registered with the drive object, and wherein storing onto the intended destination drive the portion of the program comprises storing the file sets registered with the drive object for the intended destination drive.

25. A method for installing program files of a computer program onto data storage drives of a computer system having an operating system, wherein the operating system includes native commands for querying the data storage drives available to the operating system, comprising:

making a call to a cross-platform installation program, wherein the cross-platform installation program is capable of installing the computer program on different operating system platforms;

creating with the cross-platform installation program at least one drive object representing a data storage drive and having fields for storing information about the storage drive;

making a call, with the cross-platform installation program, to an operating system interface program specific to the operating system on which the computer program is being installed; and updating, with the operating system interface program, at least one field in the drive object with information about the data storage drive.

26. The method of claimed 25, wherein said updating includes:

causing the operating system to query the data storage drive to determine an amount of free space available on the data storage drive and wherein the cross-platform installation program is capable of determining a total storage space needed to store each portion of the program intended to be stored onto the data storage drive; and installing onto the data storage drive each portion of the program intended to be stored onto the data storage drive if the total storage space needed is less than or equal to the amount of free space available on the data storage drive.

27. A system for installing a program onto data storage drives of a computer system having an operating system, wherein the operating system includes native commands for querying the data storage drives available to the operating system, comprising:

a computer including an operating system;

a computer monitor;

a memory device storing at least one drive object storing variables including a name of a data storage drive and an amount of data storage space needed to store a portion of the program intended to be stored onto the data storage drive;

program logic executed by the computer in communication with the computer monitor and the memory device, wherein the program logic performs:

(i) making a call to a cross-platform installation program, wherein the cross-platform installation program is capable of installing the computer program on different operating system platforms;

(ii) creating with the cross-platform installation program at least one drive object for representing the data storage drive and having fields for storing information about the storage drive;

(iii) making a call, with the cross-platform installation program, to an operating system interface program specific to the operating system on which the computer program is being installed; and (iv) updating, with the operating system interface program, at least one field in the drive object with information about the data storage drive.

28. The system of claim 27, wherein said operating system interface program causes the operating system to query data storage drive to determine an amount of free space available on the data storage drive and wherein the cross-platform installation program is capable of determining a total storage space needed to store each portion of the program intended to be stored onto the data storage drive; and wherein the program logic further performs installing onto the data storage drive each portion of the program intended to be stored onto the data storage drive if the total storage space needed is less than or equal to the amount of free space available on the data storage drive.

29. An article of manufacture for use in programming a computer system to install program files of a computer program onto data storage drives of a computer system having an operating system, wherein the operating system includes native commands for querying the data storage drives available to the operating system, the article of manufacture comprising computer useable media accessible to the computer system, wherein the computer usable media includes at least one computer program that is capable of causing the computer system to perform:

making a call to a cross-platform installation program, wherein the cross-platform installation program is capable of installing the computer program on different operating system platforms;

creating with the cross-platform installation program at least one drive object representing a data storage drive and having fields for storing information about the storage drive;

making a call, with the cross-platform installation program, to an operating system interface program specific to the operating system on which the computer program is being installed; and updating, with the operating system interface program, at least one field in the drive object with information about the data storage drive.

30. The article of claim 29, wherein said updating includes:

causing the operating system to query the data storage drive to determine an amount of free space available on the data storage drive and wherein the cross-platform installation program is capable of determining the a total storage space needed to store each portion of the program intended to be stored onto the data storage drive; and installing onto the data storage drive each portion of the program intended to be stored onto the data storage drive if the total storage space needed is less than or equal to the amount of free space available on the data storage drive.

* * * * *

UNITED STATES PATENT AND TRADEMARK OFFICE
CERTIFICATE OF CORRECTION

PATENT NO.     : 6,601,236 B1                                              Page 1 of 1
DATED          : July 29, 2003
INVENTOR(S)    : Bryce Allen Curtis It is certified that error appears in the above-identified patent and that said Letters Patent is hereby corrected as shown below:

Drawings,
Figure 2, delete "311-J File" and insert -- 313-J File --; and delete "311-GUI Panels- 302" and insert -- GUI Panels- 302 --.

Column 15,
Line 14, after "drive" insert -- , --.
Line 38, after "includes" delete -- the --.

Column 16,
Line 40, delete "for".
Line 46, delete "the".

Column 17,
Line 24, after "drive" insert -- , --.

Column 19,
Line 4, after "the" insert -- data --.
Line 14, after "query" insert -- the --.

Column 20,
Line 23, delete "the".

Signed and Sealed this

Second Day of December, 2003

JAMES E. ROGAN
*Director of the United States Patent and Trademark Office*